United States Patent
Robinson et al.

(10) Patent No.: US 6,376,563 B2
(45) Date of Patent: Apr. 23, 2002

(54) INLINE SOLID STATE POLYMERIZATION OF PET FLAKES FOR MANUFACTURING PLASTIC STRAP BY REMOVING NON-CRYSTALLINE MATERIALS FROM RECYCLED PET

(75) Inventors: William Donald Robinson, Walton, KY (US); Gary L. Vadnais, Grayslake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/745,482

(22) Filed: Dec. 26, 2000

Related U.S. Application Data

(60) Division of application No. 09/170,808, filed on Oct. 13, 1998, now Pat. No. 6,284,808, which is a continuation-in-part of application No. 08/794,538, filed on Feb. 3, 1997, now Pat. No. 5,886,058.

(51) Int. Cl.⁷ .............................................. C08J 11/04
(52) U.S. Cl. ........................ 521/48; 521/46.5; 525/444; 528/308.3
(58) Field of Search .................. 521/48, 46.5; 525/444; 528/308.3

(56) References Cited

U.S. PATENT DOCUMENTS

| | | |
|---|---|---|
| 3,767,601 A | 10/1973 | Knox |
| 4,022,863 A | 5/1977 | Karass et al. |
| 4,077,945 A | 3/1978 | Heinze et al. |
| 4,092,458 A | 5/1978 | Hoffman |
| 4,543,364 A | 9/1985 | Nankee et al. |
| 4,742,151 A | 5/1988 | Tate et al. |
| 5,225,130 A | 7/1993 | Deiringer |

FOREIGN PATENT DOCUMENTS

| | | |
|---|---|---|
| DE | 19710098 | 9/1998 |
| EP | 0483665 | 10/1991 |
| JP | 6184291 | 7/1994 |

OTHER PUBLICATIONS

ARC '96 Technoogy, The Spark in Recycling, Steiner et al., Nov., 1996.

*Primary Examiner*—Patricia A. Short
(74) *Attorney, Agent, or Firm*—Schwartz & Weinrieb

(57) ABSTRACT

A process for preparing a PET flake mixture for use in connection with the fabrication of high-performance plastic strapping comprises the steps of initially collecting post-consumer and non-post-consumer PET materials having an initially wide range of relatively low intrinsic viscosity (IV) values with a relatively low average intrinsic viscosity (IV) value, and processing the same through solid state polymerization (SSP) so as to obtain a wide range of relatively high intrinsic viscosity (IV) values with a relatively high average intrinsic viscosity (IV) value. The initially collected materials are chopped into flakes and chunks, and the chunks are removed by a suitable destoner so as to render the remaining mixture comprised substantially entirely of flake materials or segments. This is advantageous because the flake segments, as opposed to the chunk segments, are able to be substantially increased in intrinsic viscosity (IV) values and within a relatively short period of time, and in addition, the flake segments are essentially crystalline while the chunk segments are essentially non-crystalline which would otherwise undergo rapid crystallization and generate a substantial amount of heat of crystallization. Such heat of crystallization undesirably raises the temperature of the polymerization process whereby the materials tend to become sticky and agglomerate thereby impeding the flow of the materials being processed as well as tending to clog components of the processing apparatus.

15 Claims, 5 Drawing Sheets

INLINE SOLID STATE POLYMERIZATION OF PET FLAKES FOR MANUFACTURING PLASTIC STRAP BY REMOVING NON-CRYSTALLINE MATERIALS FROM RECYCLED PET

CROSS-REFERENCE TO RELATED PATENT APPLICATION

This patent application is a divisional of U.S. patent application Ser. No. 09/170,808 filed on Oct. 13, 1998, now U.S. Pat. No. 6,284,808, which, in turn, is a Continuation-In-Part (CIP) Patent Application of U.S. patent application Ser. No. 08/794,538 filed on Feb. 3, 1997, now U.S. Pat. No. 5,886,058, in the name of Donald Van Erden et al. and entitled INLINE SOLID STATE POLYMERIZATION OF PET FLAKES FOR MANUFACTURING PLASTIC STRAP, and is being filed herewith under 37 CFR 1.53(b).

FIELD OF THE INVENTION

The present invention relates generally to the solid state polymerization (SSP) processing of polyethylene terephthalate (PET) material, as well as the material produced by such process, and more particularly to the solid state polymerization (SSP) processing of post-consumer and non-post-consumer polyethylene terephthalate (PET) material, especially for use in connection with the fabrication or manufacture of high-performance strapping, as well as the high-performance strapping produced by such process.

BACKGROUND OF THE INVENTION

Post-consumer polyethylene terephthalate (PET), which is primarily provided by or derived from plastic soft drink bottles, can be readily obtained from material recovery facilities. Such material exhibits relatively low and heterogeneous intrinsic viscosity (IV) values, and in the past, this characteristic has prevented PET from being directly used to produce products, such as, for example, high-performance plastic strapping, which in fact require relatively high and homogeneous intrinsic viscosity (IV) values. It was one of the discoveries of the invention disclosed within the aforenoted related U.S. patent application Ser. No. 08/794,538 that such heterogeneity of the intrinsic viscosity (IV) values of the PET material did not in fact adversely affect the production of high-performance strapping, and the present invention comprises a further improvement upon the processing of such PET material.

In accordance with prior art processing techniques, the PET material, whether post-consumer and/or non-post consumer material, was initially chopped into flakes and chunks, and the flakes and chunks were extruded into pellets. The chopped PET material had a relatively low and wide range of IV values because the various soft drink bottles, for example, were manufactured by different companies using different materials exhibiting different IV values. The IV values were typically within the range of 0.65–0.80 dl/g. In accordance with such prior art processing techniques, it was further believed that in order to make a high-performance product, such as, for example, high-performance plastic strapping, from such post-consumer PET materials, it was necessary that the materials exhibit or achieve a relatively high and narrow range of IV values after the solid state processing which therefore required, as an initial step, the pelletizing of the flakes before commencement of the solid state polymerization. When the PET pellets are then subjected to solid state polymerization (SSP), the pellets would have their IV values raised and exhibit a relatively high and narrow range of IV values whereby such enhanced pellets could then be used to produce high-performance products, such as, for example, high-performance strapping.

As noted hereinabove, in accordance with the noted prior art processing techniques, the prior art solid state polymerization (SSP) of the PET materials commenced with pellets of uniform geometry. Such prior art solid state polymerization (SSP) of the pellets, however, required an inordinate amount of time, that is, approximately twelve to nineteen hours, to complete in order to produce the desired strapping, and it was not appreciated, until the invention disclosed within the aforenoted U.S. patent application Ser. No. 08/794,538, that a heterogeneous mixture of flakes and chunk-like PET materials could undergo direct solid state polymerization, without necessarily being initially pelletized, to the same or higher average IV values as those of the prior art pellets, and in a significantly faster manner, that is, upon the order of one-quarter the time required for the solid state polymerization of the pellet materials.

More specifically, while the resulting prior art strapping exhibited average IV values which were not greater than 0.90 dl/g, high-performance plastic strapping fabricated in accordance with the processing techniques disclosed within the aforenoted U.S. patent application Ser. No. 08/794,538 exhibited average IV values which were greater than 0.90 dl/g. Therefore, in accordance with the teachings of the invention embodied within the aforenoted U.S. patent application Ser. No. 08/794,538, high-performance plastic strapping could be commercially manufactured in an economical manner using PET materials, having a relatively wide distribution of IV values, and as a result of undergoing solid state polymerization directly from flaked materials which do not have to be initially pelletized.

While the solid state polymerization processing of PET flake materials, and the production of the resulting high-performance plastic strapping, as disclosed within the aforenoted U.S. patent application, having Ser. No. 08/794,538, has been quite successful and has resulted in the production of highly suitable plastic strapping, it has been discovered that the process can be further improved from an efficiency and material flow-through production basis with decreased production downtime. For example, when the PET materials, which are to be used in accordance with the processing techniques of the aforenoted invention disclosed within U.S. patent application Ser. No. 08/794,538, are in fact derived from plastic soft drink bottles, it has been discovered that as a result of the blow-molding manufacturing techniques attendant the fabrication or manufacture of soft drink bottles, the recycled PET bottles comprise essentially two different types of materials, that is, substantially crystalline wall sections and substantially non-crystalline neck sections, and accordingly, such different materials must be handled or processed differently. More particularly, the wall sections are preferably to be retained and utilized within the solid state polymerization (SSP) process, while the neck sections are preferably to be discarded from the solid state polymerization (SSP) process in accordance with the following.

It is known, for example, that temperature control of the solid state polymerization (SSP) process is critical if the temperature level of the solid state polymerization process is too low, the polymerization reaction will be too slow, while if the temperature level of the polymerization process is too high, the chips will melt or soften and thereby form clumps which will clog or jam the feeders or other components of the processing equipment. Since the wall portions of the recycled soft drink bottles are essentially crystalline, they react quickly within the solid state polymerization unit so as to desirably increase the molecular weight or intrinsic viscosity (IV) of the PET batch or charge, however, since the neck portions of the recycled soft drink bottles are substantially non-crystalline, they react quite slowly, if at all, within the solid state polymerization process in connection with the build-up or enhancement of the molecular weight or intrinsic viscosity properties of the PET materials being processed. Consequently, it is desirable from a processing efficiency point of view to have the batch or charge of PET materials within the solid state polymerization vessel to comprise more of the crystalline wall sections of the recycled PET materials than the non-crystalline neck sections of the recycled PET materials. In addition, and even more importantly, such non-crystalline neck portions or segments of the PET materials will crystallize rapidly within the polymerization processing vessel thereby emitting a significant amount of heat of crystallization. This heat of crystallization can be large enough to undesirably raise the temperature level of the process within the solid state polymerization vessel such that the PET materials tend to become sticky and agglomerate thereby forming clumps or chunks which will impede the flow of the materials within the polymerization vessel as well as clog or jam the various vessel components.

A need therefore exists in the art for effectively dealing with non-crystalline portions of recycled PET materials whereby, for example, such non-crystalline portions or segments of the recycled PET materials can be effectively removed from the batch or charge of PET materials to be fed into the solid state polymerization vessel such that processing or flow-through problems of the materials attendant temperature excursions, which would otherwise develop as a result of the rapid crystallization of such non-crystalline materials within the polymerization vessel and the consequent generation of a significant amount of heat of crystallization, would be obviated, and in addition, the processing efficiency of such recycled PET materials, and the resulting fabrication of high-performance strapping from such PET materials, can be effectively enhanced.

OBJECTS OF THE INVENTION

Accordingly, it is an object of the present invention to provide a new and improved inline solid state polymerization (SSP) process for processing PET flakes for subsequent processing of the same into high-performance plastic strapping.

Another object of the present invention is to provide a new and improved solid state polymerization (SSP) process, for processing PET flakes into high-performance plastic strapping, which obviates any operational or flow-through problems of the batch or charge of the PET materials attendant the processing of the PET materials within the solid state polymerization vessel.

Still another object of the present invention is to provide a new and improved solid state polymerization (SSP) process, for processing PET flakes into high-performance plastic strapping, which enhances the operational efficiency of the process by only using the more desirable crystalline flake components derived from the wall sections of the recycled PET materials whereby the solid state polymerization vessel facilities are optimally utilized so as to produce solid state polymerized materials which exhibit desirably high IV values, and the temperature level of the process is properly controlled so as to eliminate agglomeration and clumping of the materials which would otherwise cause flow-through problems of the batch or charge materials as well as clogging and jamming of the equipment components which would therefore result in production downtime of the equipment and increased maintenance costs.

SUMMARY OF THE INVENTION

The foregoing and other objectives are achieved in accordance with the teachings of the present invention through the provision of a process of directly converting post-consumer PET flake materials to materials having relatively high average intrinsic viscosity (IV) values whereby such resulting materials are useful in connection with the fabrication of particularly desirable products, such as, for example, high-performance strapping. High performance strapping exhibits increased weld strength. Weld strength is critically important in view of the fact that weld strength is often the weak link in strapping products. A weld strength value which is equal to 50% of the tensile strength of the strapping is considered normal for conventional or prior art high-performance strapping. As a result of the processing techniques of the present invention, however, the tensile strength, and accordingly the weld strength, of the strapping produced has been able to be increased approximately 30% with respect to the conventional or prior art high-performance strapping.

In accordance with the process of the present invention, the inventive process begins by obtaining post-consumer and non-post-consumer material containing PET. These materials may be obtained, for example, from strapping or material recovery facilities, and the materials have a relatively wide range of initial IV values, such as, for example, from 0.70 dl/g to 0.81 dl/g. The PET materials usually contain a variety of impurities, such as, for example, PVC, aluminum, polyethylene, polypropylene, and paper.

The PVC and aluminum materials are initially removed from the PET materials, and the PET materials are chopped into a heterogeneous mixture of flakes and chunks. As noted hereinabove, the material chunks are undesirable from the points of view of not being especially useful in enhancing the IV values of the PET materials, as well as adversely affecting the temperature level of the solid state polymerization process. In accordance with the specific teachings of the present invention, it is therefore desirable to remove such material chunks from the batch or charge of PET materials and such a process step is achieved by using a suitable destoner or sorter which effectively removes or sorts all or a large percentage of the chunk or neck portions of the PET materials from the flake or wall portions of the PET materials as a result of the different thickness and density properties of the chunk or neck portions of the PET materials as compared to similar properties characteristic of the flake or wall portions of the PET materials. As a result, essentially only desirable flakes or wall portions of the PET materials are further utilized within the solid state polymerization process so as to permit an enhanced volume of favorable or desirable PET materials to be processed, enhanced IV values of the processed PET materials is readily achieved, and the processing equipment is readily permitted to operate with a reduced amount of production downtime or production run interruptions as a result of the elimination of any agglomeration or clumping of the PET materials due to the desirably proper control of the operative processing temperatures.

After separation of the undesirable chunk or neck portions of the PET materials from the batch or charge of PET materials which now contains or comprises essentially only flake or wall portions of the PET materials, the PET materials are preheated within a fluid bed type dryer or preheater so as to undergo a preheating stage at a temperature level of approximately 315° F. and a time period of approximately 20–25 minutes. As a result of such preheating process step, the PET materials are dried in view of molecular water having been removed therefrom. Subsequently, the PET flakes are now ready to enter the first stage of solid state polymerization, and accordingly, the PET flakes are placed into a hopper and heated in the absence of oxygen and in the presence of nitrogen until they reach a temperature level of between 390° F. and 430° F.

After undergoing the first stage of solid state polymerization for approximately one hour or more, the flakes are ready to enter the second stage of solid state polymerization, and accordingly, the heated flake mixture is removed from the hopper and placed within a bin in the absence of oxygen and in the presence of nitrogen. The flakes are heated to a temperature level of approximately 425° F. and remain in the bin for a time period of approximately four hours.

Once the flakes have completed the first and second stages of solid state polymerization, the IV value of the resulting PET material has been increased to at least 0.90 dl/g, and to as high as 1.50 dl/g, withe the average IV value being approximately 0.95 dl/g. The PET flakes, having the enhanced IV values, can then be extruded through a suitable extruder so as to produce high-performance strapping. The strapping produced by means of the process of the present invention, that is, utilizing PET flakes which have been directly subjected to solid state polymerization, which have not necessarily been subjected to intermediate pelletization, and which have resulted in material having an enhanced average IV value of approximately 0.95 dl/g and a wide distribution of IV values within the range of 0.90 dl/g to 1.50 dl/g, is therefore able to comprise high-performance strapping which exhibits good tensile strength, weld strength, and joint strength characteristics. In addition, the solid state polymerization process to which the flakes of the present invention are subjected only requires a fractional amount of time that was previously required in connection with the prior art processing of the PET material pellets. As a result, in addition to the elimination of the substantially non-crystalline chunk segments or portions of the PET materials which enhances the flow-through processing of the materials and operational efficiency of the equipment without undergoing or experiencing operational interruptions or production downtime, the economical processing efficiency of PET materials, that is, the amount of time to process a particular batch or charge of PET material, is enhanced still further.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1A:
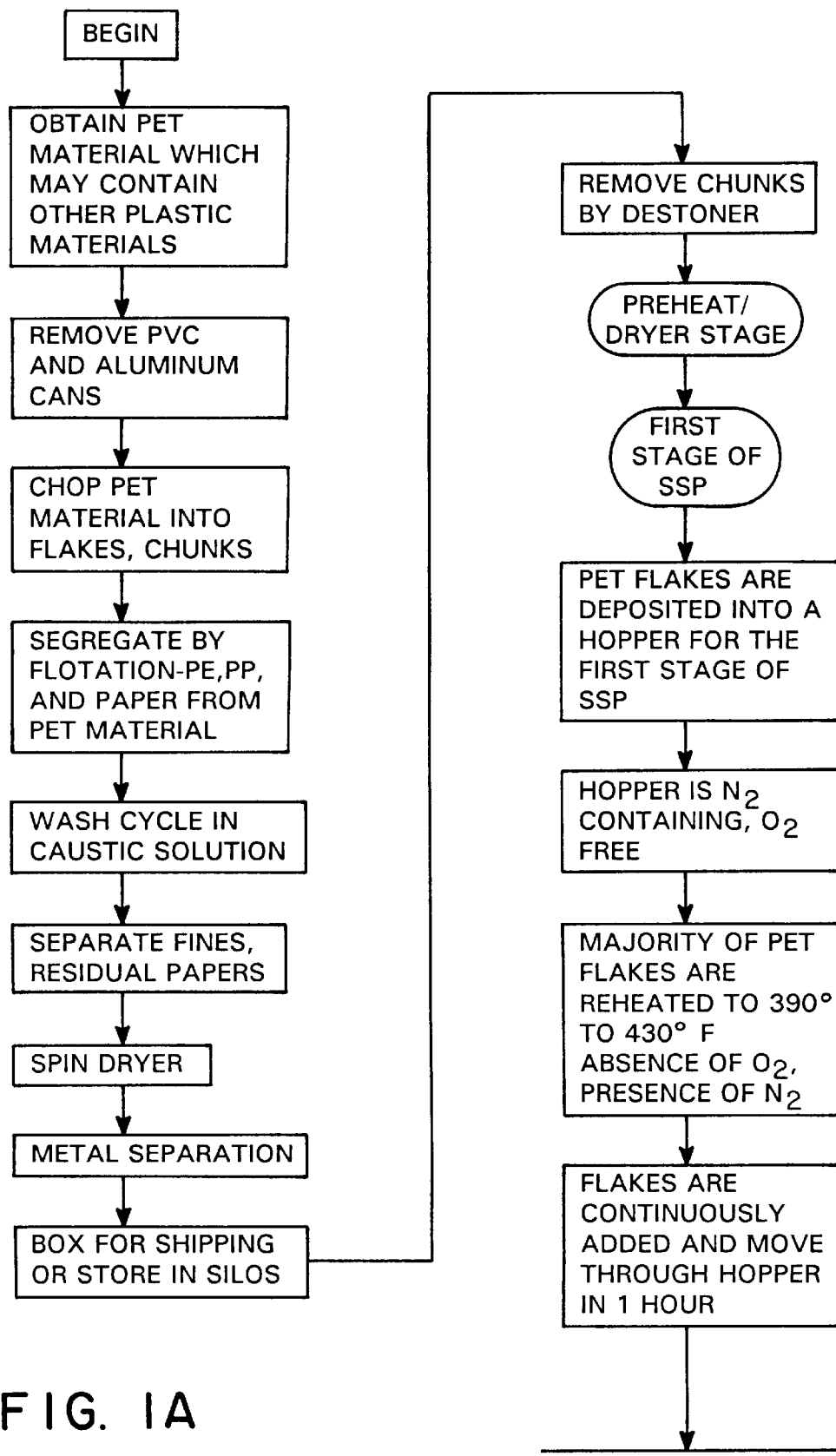
FIGS. 1A–1C comprise a flow chart showing the various steps of the PET flake process of the present invention.

Referring now to the drawings, and more particularly to FIG. 1A thereof, post-consumer and non-post-consumer polyethylene terephthalate (PET) materials are collected from any one or more of various different sources, including, for example, material recovery facilities, and the materials are co-mingled into a heterogeneous mixture. In addition to containing or comprising polyethylene terephthalate (PET) materials, the mixture also usually contains various other materials, such as, for example, PVC, polypropylene, polyethylene, aluminum, and the like, which are not desirable for use within the solid state polymerization (SSP) processing of the PET materials in accordance with the present invention. Accordingly, the PVC materials and aluminum cans, for example, are initially removed from the PET materials by several means, such as, for example, appropriate or suitable cameras or sensors which can detect or distinguish, for example, PVC containers or bottles from PET containers or bottles, and in addition, operator personnel are also used to physically separate, for example, the aluminum cans and the like.

The residual PET materials are then chopped into flakes and chunks so as to render such constituents or components suitable for further processing in accordance with the subsequent processing steps characteristic of the present invention. The flakes and chunks are respectively derived, for example, from wall portions and neck portions of plastic soft drink bottles, with the neck or chunk portions being thicker and denser than the wall or flake portions. The materials are then subjected to a flotation segregation process which serves to separate the polyethylene, polypropylene, and any paper material from the PET materials as a result of bulk density techniques whereby the polyethylene, polypropylene, and paper material components float to the top of the flotation apparatus while the PET materials sink to the bottom of the flotation apparatus.

Subsequent to the flotation segregation processing step, the PET flake and chunk materials are subjected to a wash cycle within a suitable caustic solution so as to remove any dirt, grime, paper labels, liquid syrups, and the like from the materials. After completion of the wash cycle, the chopped materials are subjected to another flotation segregation or separation process whereby fines, or any residual papers which were not in fact removed as a result of the first flotation segregation process but which have been separated from the PET materials as a result of the caustic solution, are removed from the cleansed PET materials. The cleansed materials are then deposited within a suitable dryer whereby the materials undergo a spin cycle not unlike that of a clothes washing machine, and subsequently, the materials discharged from the spin dryer are passed through a metal separation stage or phase whereby suitable metal detectors are utilized to separate, for example, any chopped portions of aluminum cans, aluminum caps, or the like, which may have been initially co-mingled with the PET materials. The resulting PET materials are then boxed for shipping or deposited within suitable storage silos so that the same will be available when needed for actual processing in accordance with the solid state polymerization (SSP) processing of the present invention.

Figure 3:
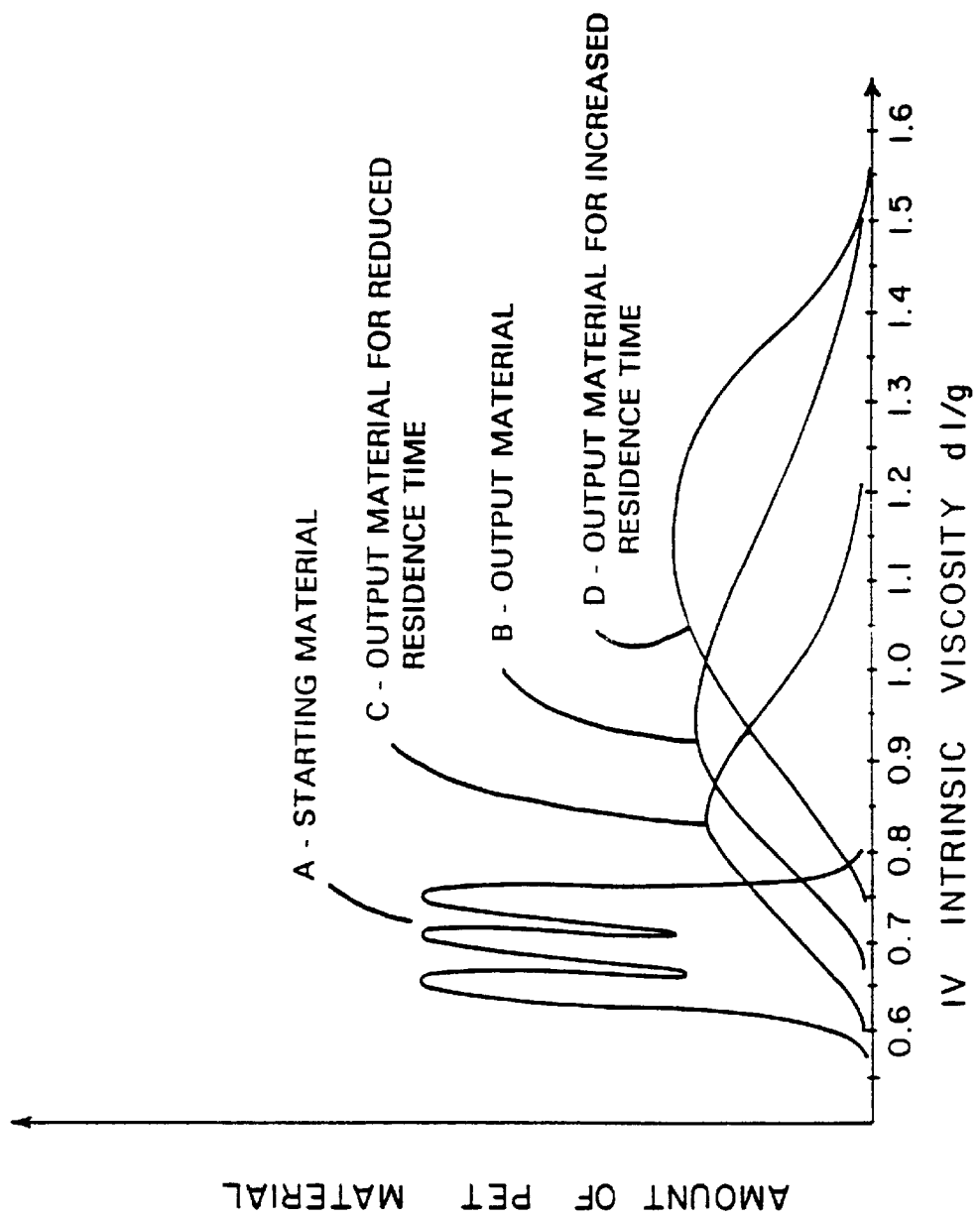
FIG. 3 is a graph showing the relationship between the amount of PET material and the intrinsic viscosity (IV) for a starting material and various resulting materials produced under different conditions.

The PET materials prepared in accordance with the foregoing process steps initially have a substantially wide intrinsic viscosity (IV) value range which in fact extends from a relatively low IV value of approximately 0.60 dl/g to a relatively high IV value of approximately 0.80 dl/g, with the average initial IV value being approximately 0.70 dl/g as shown by curve A in FIG. 3. The reason for this range of IV values is due, for example, to the fact that different plastic soft drink bottles art manufactured by different bottle manufacturers using different plastic materials. It is also to be appreciated still further that the initial mixture of PET materials can have IV values which may differ from those noted hereinabove depending upon the particular source of the materials. It is possible, for example, to use recycled materials, other than plastic soft drink bottles, which are characterized by relatively low IV values, or alternatively, to use recycled high performance strapping made either by prior art processes or by the process of the present invention whereby such strapping may exhibit average IV values of 0.90 dl/g or higher. In any case, in accordance with the various teachings of the present invention, it is possible to produce, from a heterogeneous mixture having a relatively wide or broad distribution of IV values of, for example, 0.60–0.80 dl/g and characterized by a relatively low average IV value of, for example, 0.70 dl/g, resultant materials which have a relatively wide or broad distribution of IV values of, for example 0.70 dl/g to 1.50 dl/g and characterized by a relatively high average IV value of, for example, 0.95 dl/g as illustrated by means of curve B shown in FIG. 3.

The precise curves and material results or characteristics will of course depend upon the initial input material characteristics and the particular processing parameters, and accordingly, curves C and D of FIG. 3 illustrate other resultant materials having relatively wide distributions of IV values with, however, different average IV values, the different materials being produced as a result of different process residence times. It is therefore to be appreciated that in accordance with the processing techniques and parameters characteristic of the present invention, resulting solid state polymerized (SSP) material, having an average IV value of, for example, approximately 0.80–0.85 dl/g and useful or suitable for fabricating high-performance strapping exhibiting currently or conventionally acceptable quality and performance characteristics, can in fact be fabricated merely by reducing the residence time of the materials within the process. Accordingly, still further, and quite advantageously, high-performance strapping exhibiting conventionally acceptable average IV values, and tensile strength and weld strength characteristics, can be manufactured faster and more economically when ultra-high-performance strapping, which can also be manufactured in accordance with the various processing techniques characteristic of the present invention and having an average IV value of, for example, 1.15 dl/g, are not in fact required for particular applications.

As was noted hereinabove, the initial material comprising the charge or batch of material to be processed is comprised of a heterogeneous mixture of flakes and chunks from which, at this stage of the process of the present invention, undesirable PVC, polypropylene, polyethylene, paper, and aluminum impurities have been segregated. It has been additionally determined or discovered, however, that from an economical and processing efficiency point of view, that the material chunk portions or segments of the batch or charge materials are equally undesirable and should likewise be segregated and discarded from the solid state polymerization (SSP) process and the processing equipment. The reasons for this are several.

Firstly, as has been noted hereinabove, the material chunk portions or segments of the batch or charge materials comprise essentially or substantially non-crystalline PET materials which react quite slowly, if at all, within the solid state polymerization (SSP) process in connection with the enhancement or build-up of the molecular weight or intrinsic viscosity (IV) values or properties of the PET materials being processed. Consequently, in order to in fact achieve the enhanced molecular weight or IV values of the resulting or processed materials, it is desirable to maximize the percentage amount of crystalline PET materials, and to concomitantly minimize the percentage amount of non-crystalline PET materials, within the batch or charge PET materials undergoing the solid state polymerization process.

Secondly, in view of the fact that the chunk material portions are essentially or substantially non-crystalline PET materials, such materials will rapidly crystallize within the polymerization processing vessel thereby generating a significant amount of heat of crystallization. Such generated heat of crystallization can be large enough to undesirably raise the temperature level of the process within the solid state polymerization vessel such that the PET materials disposed therein tend to become sticky and agglomerate together thereby forming clumps or material chunks which will tend to impede the flow of the materials within the polymerization vessel as well as to clog or jam the feeder or other operational components of the processing apparatus.

In view of the foregoing, and in accordance with the specific teachings of the present invention, it has been discovered that the relatively thick and dense non-crystalline bottle neck or chunk portions or segments of the charge or batch PET materials can be effectively removed from the heterogeneous mixture of materials prior to entry of the mixture of materials into the solid state polymerization processing stages, and this step of the process can be achieved with a commercially available "destoner". Conventionally, such apparatus is currently used or designed to remove dense stones from low density grains or powders. The apparatus works upon vibrational and fluidization principles whereby the dense stones are effectively separated from the less dense grains or powders.

However, it has been discovered that such apparatus is also useful in separating the thicker and denser bottle neck or chunk portions or segments of the PET materials from the thinner and less dense wall or flake portions or segments of the PET materials. An exemplary destoner machine or apparatus that may be utilized within the process of the present invention is the FORSBERG G-4 Sorter or the FORSBERG P-6R Vacuum Destoner, both of which are manufactured by the FORSBERG CORPORATION, MINNESOTA, although of course, it is to be readily appreciated that other similar types of apparatus, which operate upon similar separating principles or techniques, can of course be utilized.

Accordingly, with continued reference being made to FIG. 1A, after the PVC, polypropylene, polyethylene, paper, and aluminum impurities have been segregated from the charge or batch materials, and after the remaining charge or batch materials have been destoned so as to remove the PET material chunks or bottle neck portions therefrom, the flake materials are placed within a suitable fluid bed type pre-heater or dryer so as to undergo a pre-heating stage. In the preheater or dryer, the PET flake materials are heated to a temperature level of approximately 315° F. and for a time period of approximately 20–25 minutes. The purpose of the pre-heating stage is essentially to dry the flake materials so as to remove molecular water therefrom.

The PET flakes are now ready for the first stage of the solid state polymerization process. It is known that the different thickness characteristics of dimensions of different products or materials affects the time required to solid state the materials to a predetermined IV value, and as noted in the aforenoted related parent patent application, the relatively thicker neck or chunk portions were slower to solid state than the relatively thinner wall or flake portions. The first stage of solid state polymerization comprises increasing the temperature of the charge or batch of PET materials, and in view of the fact that the chunk portions or materials have been previously removed from the flake portions or materials, the time required for processing the wall or flake portions or materials is relatively short whereby enhanced processing efficiency, comprising the processing flow-through of the flake or wall portions of the materials, is able to be achieved. More particularly, the PET flakes are deposited within a hopper which comprises an oxygen-free environment within which nitrogen is disbursed. The temperature of the materials is elevated to approximately 390° F.–430° F., and the flakes are continuously deposited into the hopper, and they continuously move through the hopper from the top of the hopper to the bottom of the hopper, during which time the materials experience a slight increase in their IV values. In accordance with one embodiment or example of practicing the present invention process, this first stage of solid state polymerization took approximately one hour.

The heated PET flakes are now ready for the second stage of solid state polymerization. Accordingly, the flakes are removed from the preheating hopper and are continuously deposited into a bin. The heated PET flakes are retained within the bin for a processing time period of approximately four hours during which time the flakes travel from the top of the bin to the bottom of the bin, and the temperature level within the bin is in the range of 380° F. to 425° F. in accordance with a nitrogen cycle which will be explained more fully hereinafter. As a result of such processing, the intrinsic viscosity (IV) value of the PET flakes, which was initially within the range of approximately 0.60 dl/g to 0.80 dl/g, increases substantially to an average IV value of approximately 0.95 dl/g and with a wide distribution of IV values ranging from approximately 0.70 dl/g to 1.5 dl/g as shown, for example, by means of curve B in FIG. 3. The heated, high intrinsic viscosity flakes may then be removed from the bin and fed directly to an extruder from which high-performance strapping, having an IV value within the range of 0.80–1.0 dl/g, may be manufactured.

Figure 2:
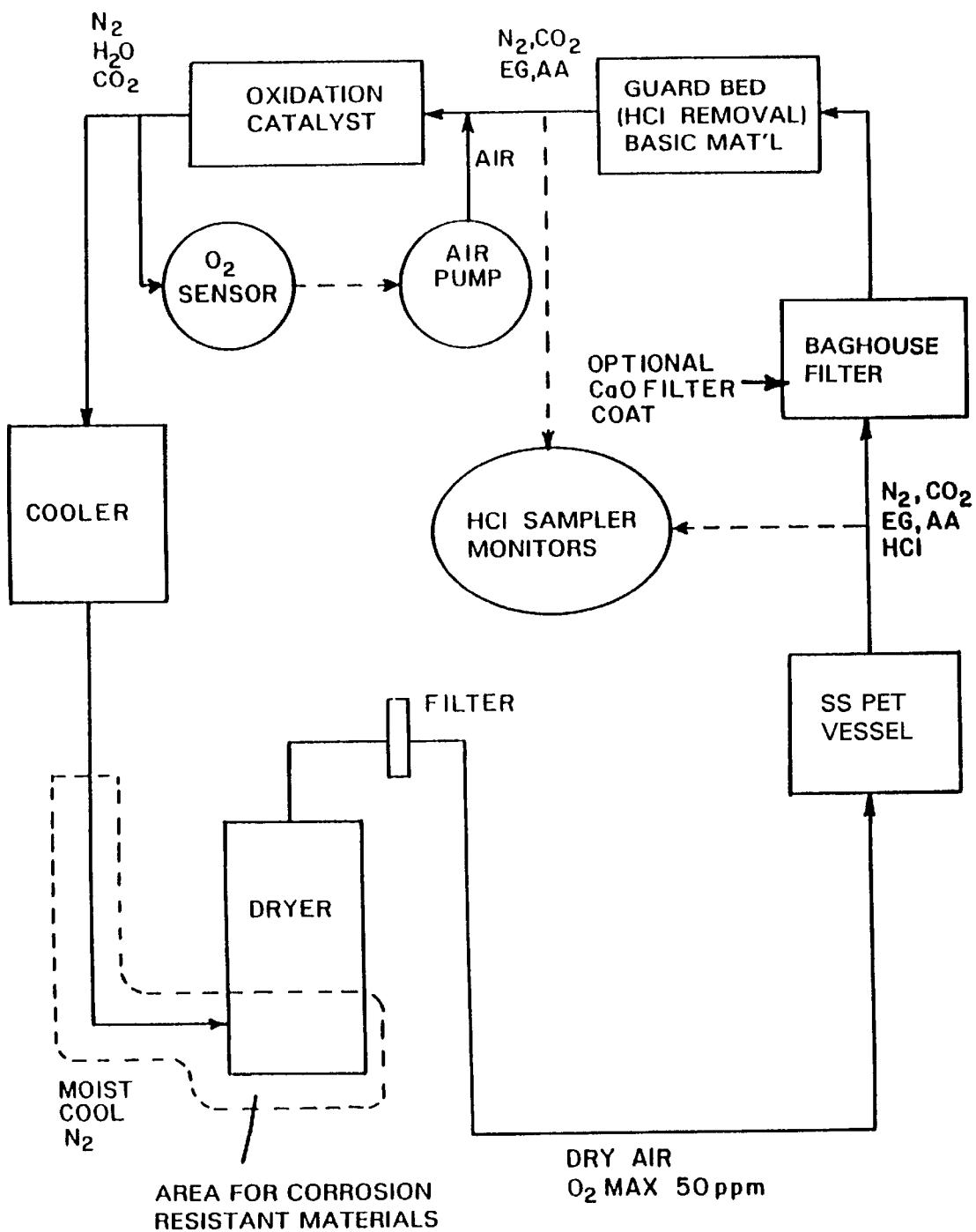
FIG. 2 is a flow chart of a nitrogen cycle portion, of the solid state polymerization (SSP) stage of the process of the present invention, including the use of a guard bed for HCl removal.

The nitrogen cycle utilized within the second stage of solid state polymerization is more fully illustrated in FIG. 2 and comprises supplying pure nitrogen to the bottom of the bin and aspirating contaminants from the top of the bin. The nitrogen travels upwardly through the bin and through the flakes, and in so doing, the nitrogen reacts with the flakes so as to extract acelhyde, ethylene glycol, and hydrochloric acid (HCl). The nitrogen supplied or used within the nitrogen cycle may either be continuously supplied pure nitrogen or nitrogen which has been derived from the cycle and purified of the contaminants. If the latter option is chosen, the same nitrogen can of course be reused which renders the process somewhat more economical.

The contaminants can be removed from the nitrogen in accordance with any one of several different techniques or processes. One way is through the desiccant process formulated by BEPEX $^R$. Another means is through removal of waste products by the catalytic oxygen process developed by BUHLER $^R$. A still further manner for removing hydrochloric acid (HCl) from the nitrogen cycle is through the use of a lime bag filter apparatus which eliminates the HCl from the flow of gas. Yet another manner in which to remove the HCl from the nitrogen cycle is to conduct the gas through a water spray whereby the HCl is absorbed in the water slurry. A further endeavor may comprise the use of a guard bed of basic material as will be discussed more fully hereinafter.

The removal of the contaminants, and in particular, the removal of the HCl, is important for several reasons. During the second stage of the solid state polymerization, the amount of HCl that is emitted is relatively small, however, the presence of the HCl may nevertheless cause problems within at least two areas or regions of the apparatus and process of the present invention, that is, in connection with catalytic activity, and also in connection with corrosion, especially when liquid water is or may also be present. HCl is known to deactivate a platinum catalyst, although the amount of such deactivation, as might be encountered during practice of the present invention process, is not precisely known. Increased temperature can offset some of the catalyst deactivation but at an increased risk of sintering, that is, permanent deactivation, of the catalyst. Increasing the size of the catalyst bed is also an option for offsetting lower catalyst activity, however, this option increases catalyst costs, drops the pressure within the system, and may require additional blower capacity. In connection with the corrosion problems, liquid water tends to absorb HCl from the passing gas stream and concentrate the same to levels where corrosion rates become problematic. This condition appears to exist at a location after the condenser which cools the process stream and before the absorbent bed.

In accordance then with various embodiments envisioned by the teachings of the present invention, as more specifically illustrated in FIG. 2, and as noted briefly hereinbefore, the problems of catalytic deactivation and corrosion due to HCl reactions may be eliminated by removing the HCl from the process of the present invention as soon as possible by utilizing a guard bed of basic material. Such a guard bed may be added to the BUHLER $^R$ line just before the catalyst bed, or alternatively, may be incorporated within the bag house filter assembly just after the solid state fluidized bed. In accordance with another embodiment, the guard bed may be placed after the bag house filter assembly so as to avoid plugging the same with PET particles. In accordance with still another embodiment, the relatively simpler BEPEX $^R$ design omits the catalyst bed, so consequently, the guard bed can be placed immediately after the solid state fluidized bed or in the bag house filter assembly. In accordance with techniques employed in connection with placing the guard bed within the bag house filter assembly, the bag house filter can be coated with a basic solid, such as, for example, calcium oxide, lime, caustic soda, or bicarbonate, so as to neutralize the acid. In this case, the conventional filter bags would be replaced by those of the present invention. Still yet alternatively, the guard bed may also take the form of a spray chamber which sprays water or bicarbonate.

With reference continuing to be made to FIG. 2, suitable monitors may also be incorporated within the processing line or system for detecting the levels of HCl present within the system or the various processing components thereof. The levels of HCl could occasionally rise due to the presence of PVC material within the solid state fluidized bed. A simple HCl monitor can comprise a small fluid stream of known flow rate into a scrubber-bubbler attached to an automated titration unit, and the consumption of bases or basic materials so as to maintain constant pH values would constitute a simple yet direct way to measure HCl levels.

Due to the fact that steel or even stainless steel is likely to corrode at excessive rates when liquid water is in the presence of HCl or $Cl_2$, the apparatus of the present invention may be constructed from alternatively viable construction materials, such as, for example, CPPC, PP, or a steel having a corrosion-resistant coating. The 13× molecular sieves used in the BEPEX $^R$ desiccant process are also known to degrade in the presence of acids. Accordingly, a larger bed may have to be used so as to compensate for the lost drying capacity. The deterioration of the sieves may also produce powdered sieves. If this happens, the powder could be carried into the PET production materials and/or accumulate within the lower end of the desiccant vessel and thereby impede gas flow. In order to prevent this from occurring, a section of the production facility or plant could be provided with suitable filters so as to filter out the generated powder materials and thereby prevent PET contamination with the same, and easily accessible access ports could be provided within the bottom regions of the apparatus whereby cleaning of the facility is readily facilitated. In accordance with still another embodiment, the nitrogen may be drenched, as the same passes through the fluidized bed, with by-pass desiccant fumes. In any case, once the nitrogen has been purified of its contaminants by any one of the foregoing processes, the purified nitrogen can be conducted back into the bottom of the bin so as to undergo another nitrogen cycle. The process can be conducted either as a batch process or as a continuous process. One of the important factors in connection with the process of the present invention is that the nitrogen gas removes volatile polymerization reaction products, including ethylene glycol and other impurities, which can cause undesirable secondary reactions. If, for example, more than twenty parts per million of PVC is still contained within the flakes after the preheater stage, the flakes will produce HCl and degrade the desiccant which is used to purify the nitrogen used in the second stage of the solid state polymerization (SSP) process. As such, the desiccant would have to be replaced more than once per year due to the reactions between the HCl and the desiccant.

As briefly noted hereinabove, after the flakes have passed through the hopper and bin structures of the first and second stages, respectively, of the solid state polymerization process, the flake products are removed from the bin of the second stage of the solid stage polymerization process and directly fed in a hot state to the feed hopper of the extruder from which the high-performance strapping is to be produced. The feeding of the hot flake products or materials directly from the solid state polymerization second stage bin to the strap-producing extruder is economically advantageous in that such processing conserves significant heat within the polymer materials and accordingly reduces the power requirements per pound of polymer to be extruded.

The degree of uniformity of the product resulting from the process of the present invention is surprising in view of the variety and relatively wide range of the intrinsic viscosity (IV) values of the initial materials. In addition, in view of the incorporation of the destoner or similar apparatus into the process of the present invention, heating and solid state polymerization of the PET flakes proceeds readily, rapidly, and without any substantial problems, such as, for example, agglomeration of the polymers, sticking of the polymers to the processing equipment, or degradation of the polymers, as is often the case with pellets. An unexpected result achieved by means of the process of the present invention is the production of a product which has a relatively high average IV value and which was obtained using materials having a wide range of relatively low initial IV values. Stated alternatively, an initially narrow range of IV values is not in fact required in either the initial materials which will undergo the solid state polymerization process and which will be used to manufacture strapping, or in the final strapping itself so as to obtain high quality, high-performance plastic strapping.

Figure 1B:
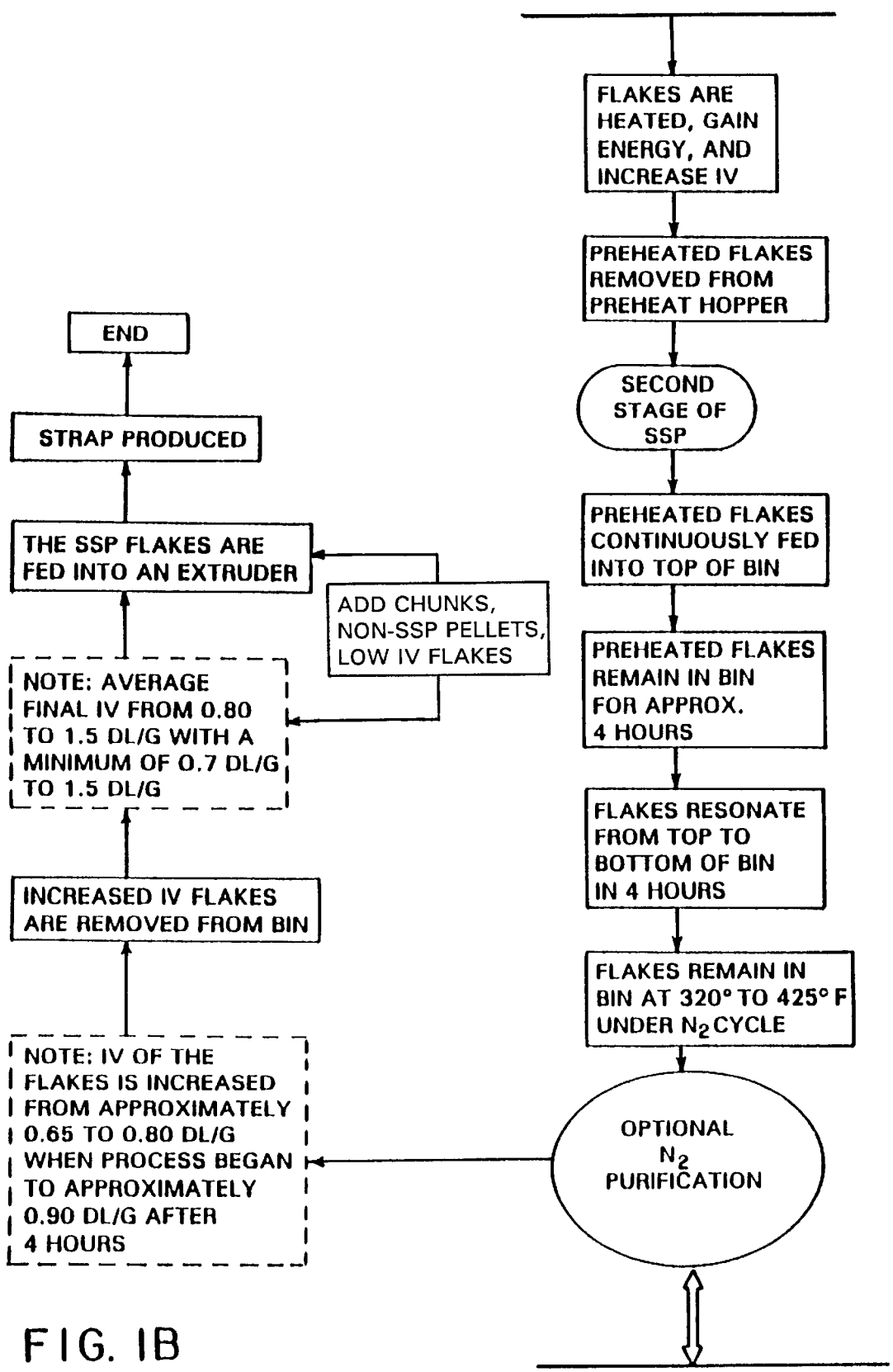
Figure 1C:
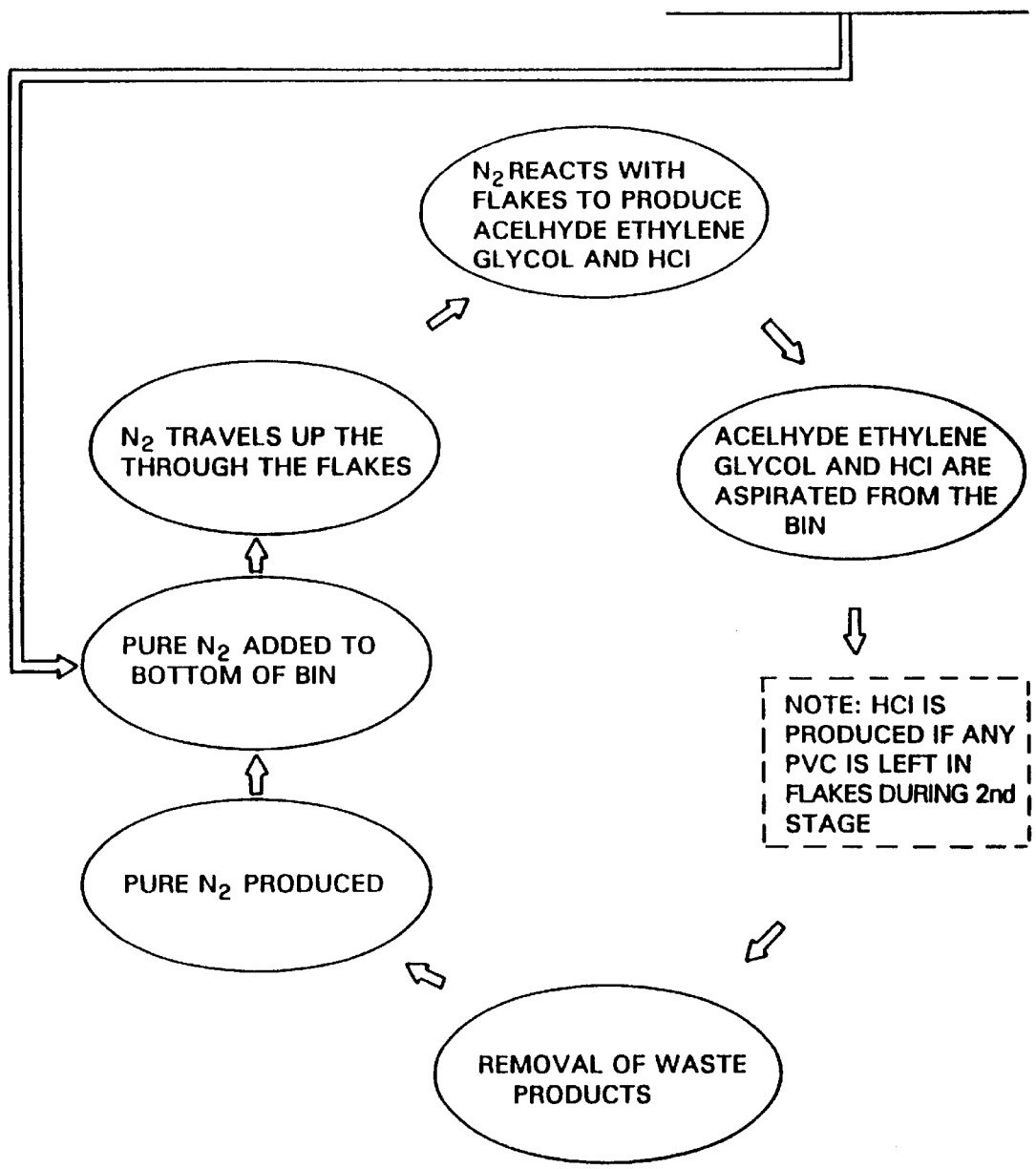

Thus, it may be seen that the solid state polymerization process of the present invention advantageously leads to the production of high-performance strapping in an economically desirable manner from both material flow-through and production downtime points of view, although obviously, many modifications and variations of the present invention are possible in light of the above teachings. For example, the precise operating or procedural parameters of the process of the present invention may be altered somewhat in order to achieve desired intrinsic viscosity (IV) values. Intrinsic viscosity increases with increased amounts of nitrogen gas, with increased temperature levels within the solid state polymerization stages, as well as with increased residence times within the solid state polymerization stages. It has also been determined that preheating the flakes to reaction temperature levels reduces the size of the bin necessary to effect solid state polymerization. In addition, it has been further determined that relatively thin flakes exhibit increased IV values much faster than pellets or relatively thick chunks, and they obtain high IV values, and most significantly or importantly, flakes, unlike pellets or chunks, are most desirable in view of the fact that the flakes do not become sticky or cause agglomeration either in the first or second stage of the solid state polymerization. Nevertheless, it is to be appreciated that the neck portions of, for example, the bottles or beverage containers from which the material chunks are derived are valuable or important components in that subsequent to the solid state polymerization processing of the PET flake components, the neck material chunk portions, along with recycled pellets that are not solid state polymerized, or low intrinsic value (IV) flakes may, as an alternative or option, be added to the solid state polymerized flakes as the latter are being fed into the extruder, as shown in FIG. 1B, in order to adjust the resulting intrinsic value (IV) of the mixture being fed into the extruder whereby the resulting strapping will have predetermined or particularly desired characteristics or parameters.

It is also noted that oxygen is not added during either the preheat or solid state polymerization stages because the presence of oxygen will degrade and color the polymers, nitrogen therefore being the preferred gas to be used in the solid state polymerization process because it does not lead to the adverse effects that would be caused by oxygen. In addition, nitrogen is also economical and readily available. It is therefore to be understood that within the scope of the appended claims, the present invention may be practiced otherwise than as specifically described herein.

What is claimed as new and desired to be protected by Letters Patent of the United States of America, is:

1. A process of forming a polyethylene terephthalate (PET) material mixture which is suitable for subsequent processing, comprising the steps of:

collecting diverse PET materials having a relatively wide distribution of intrinsic viscosity (IV) values;

co-mingling said collected PET materials and reforming said co-mingled PET materials into a heterogeneous mixture of PET materials comprising substantially crystalline flake segments and non-crystalline chunk segments; and removing said substantially non-crystalline chunk segments from said heterogeneous mixture of PET materials so as to leave substantially only said substantially crystalline flake segments within said heterogeneous mixture of PET materials such that when said heterogeneous mixture of PET materials comprising substantially only said substantially crystalline flake segments is processed further so as to increase said intrinsic viscosity (IV) values of said PET materials, the generation of a substantial amount of heat of crystallization within said processed mixture of said PET materials will be effectively prevented.

2. The process as set forth in claim 1, wherein:

said intrinsic viscosity (IV) values of said collected PET materials are within the range of 0.60 dl/g to 0.80 dl/g.

3. A process for making a polyethylene terephthalate (PET) material, comprising the steps of:

collecting diverse PET materials having a relatively wide distribution of intrinsic viscosity (IV) values;

co-mingling said collected PET materials and reforming said co-mingled PET materials into a heterogeneous mixture of PET materials comprising substantially crystalline flake segments and non-crystalline chunk segments;

removing said substantially non-crystalline chunk segments from said heterogeneous mixture of PET materials so as to leave substantially only said substantially crystalline flake segments within said heterogeneous mixture of PET materials such that when said heterogeneous mixture of PET materials comprising substantially only said substantially crystalline flake segments is processed further so as to increase said intrinsic viscosity (IV) values of said PET materials, the generation of a substantial amount of heat of crystallization within said processed mixture of said PET materials will be effectively prevented; and subjecting said heterogeneous mixture of PET material, comprising substantially only said substantially crystalline flake segments, to a solid state polymerization (SSP) process so as to form a heterogeneous PET material having an enhanced intrinsic viscosity (IV) value.

4. The process as set forth in claim 3, wherein:

said intrinsic viscosity (IV) values of said collected PET materials are within the range of 0.60 dl/g to 0.80 dl/g.

5. The process as set forth in claim 3, wherein:

said formed heterogeneous PET material has an average intrinsic viscosity (IV) value of at least 0.90 dl/g.

6. The process as set forth in claim 3, wherein:

said formed heterogeneous PET material has an intrinsic viscosity (IV) value range of 0.90 dl/g to 1.5 dl/g.

7. The process as set forth in claim 3, further comprising the steps of:

identifying any PVC impurities found within said collected diverse PET materials; and removing said identified PVC impurities prior to said reforming of said PET materials into said heterogeneous mixture of substantially crystalline flake segments and non-crystalline chunk segments.

8. The process as set forth in claim 3, wherein said solid state polymerization step comprises the steps of:

incorporating a nitrogen cycle within said solid state polymerization; and removing a majority of HCl contaminants, forming during said nitrogen cycle portion of said solid state polymerization step, by passing the nitrogen present within said nitrogen cycle, and including said HCl contaminants, through a guard bed of basic material.

9. A process for forming a polyethylene terephthalate (PET) material, suitable for use in making high-performance plastic strapping, comprising the steps of:

collecting diverse PET materials having a relatively wide distribution of intrinsic viscosity (IV) values;

co-mingling said collected PET materials and reforming said co-mingled PET materials into a heterogeneous mixture of PET materials comprising substantially crystalline flake segments and non-crystalline chunk segments; and removing said substantially non-crystalline chunk segments from said heterogeneous mixture of PET materials so as to leave substantially only said substantially crystalline flake segments within said heterogeneous mixture of PET materials such that when said heterogeneous mixture of PET materials comprising substantially only said substantially crystalline flake segments is processed further so as to increase said intrinsic viscosity (IV) values of said PET materials, the generation of a substantial amount of heat of crystallization within said processed mixture of said PET materials will be effectively prevented; and subjecting said heterogeneous mixture of PET materials, comprising substantially only said substantially crystalline flake segments, to a solid state polymerization (SSP) process so as to form a heterogeneous PET material having an enhanced intrinsic viscosity (IV) value.

10. The process as set forth in claim 9, wherein:

said intrinsic viscosity (IV) values of said collected PET materials are within the range of 0.60 dl/g to 0.80 dl/g.

11. The process as set forth in claim 9, wherein:

said formed heterogeneous PET material has an average intrinsic viscosity (IV) value of at least 0.90 dl/g.

12. The process as set forth in claim 9, wherein:

said formed heterogeneous PET material has an intrinsic viscosity (IV) value range of 0.90 dl/g to 1.5 dl/g.

13. The process as set forth in claim 9, further comprising the steps of:

identifying any PVC impurities found within said collected diverse PET materials; and removing said identified PVC impurities prior to said reforming of said PET materials into said heterogeneous mixture of substantially crystalline flake segments and non-crystalline chunk segments.

14. The process as set forth in claim 9, wherein said solid state polymerization step comprises the steps of:

incorporating a nitrogen cycle within said solid state polymerization; and removing a majority of HCl contaminants, formed during said nitrogen cycle portion of said solid state polymerization step, by passing the nitrogen present within said nitrogen cycle, and including said HCl contaminants, through a guard bed of basic material.

15. The process as set forth in claim 9, further comprising the step of:

extruding said solid stated PET material so as to fabricate a high-performance plastic strap.

* * * * *